(12) United States Patent
Kobayashi et al.

(10) Patent No.: US 6,396,538 B1
(45) Date of Patent: May 28, 2002

(54) VIDEO CAMERA WITH OPTICAL ZOOM MECHANISM AND PICTURE STABILIZER

(76) Inventors: Akio Kobayashi, 1-21-30, Sugiyamate, Hirakata-shi, Osaka-fu; Toshiyuki Okino, 203, Tuinkotohirata, 2058, Hayami-cho, Kadoma-shi Osaka-fu; Toshiya Iinuma, 3-47-8-402, Yagumokita-cho, Moriguchi, Osaka-fu, all of (JP)

( * ) Notice: Subject to any disclaimer, the term of this patent is extended or adjusted under 35 U.S.C. 154(b) by 0 days.

(21) Appl. No.: 07/971,169

(22) Filed: Nov. 4, 1992

(30) Foreign Application Priority Data

Nov. 5, 1991 (JP) ............................................. 3-288817

(51) Int. Cl.$^7$ ............................................. H04N 5/225
(52) U.S. Cl. ........................ 348/240; 348/358; 348/208
(58) Field of Search .................. 348/240, 358, 348/208

(56) References Cited

U.S. PATENT DOCUMENTS 4,231,066 A   10/1980  Merchant
4,843,475 A * 6/1989  Imai ........................... 358/225

FOREIGN PATENT DOCUMENTS

| JP | 2195780 | | 8/1990 | |
| JP | 2250470 | | 10/1990 | |
| JP | 3256460 | * | 11/1991 | .......... H04N/5/232 |
| JP | 4329077 | * | 11/1992 | .......... H04N/5/232 |
| JP | 4349790 | * | 12/1992 | .......... H04N/5/232 |

OTHER PUBLICATIONS

Funkschau vol. 63 No. 9 Apr. 19, 1991 pp. 60–61 Article by Dieter Haas.
IEEE Transactions on Consumer Electronics vol. 36, No. 3 Aug. 1990 Entitled "Stabilizing Systems . . . " pp. 510–519.

\* cited by examiner

*Primary Examiner*—Wendy R. Garber
(74) *Attorney, Agent, or Firm*—Stanger & Dreyfus, P.C.

(57) ABSTRACT

A video camera including an optical zoom mechanism and an electronic zoom circuit which is used at a time that a magnification of the optical zoom mechanism reaches a limit thereof or a time that a picture stabilization is to be performed. If a magnification of an electronic zoom is smaller than "1.2" at a timing when a stabilization switch is turned-on, a microcomputer not only gradually increases an electronic zoom magnification up to "1.2" and but also gradually decreases an optical zoom magnification. If the magnification of the electronic zoom is smaller than "1.2" at a timing when the stabilization switch is turned-off, the microcomputer gradually decreases the electronic zoom magnification to an electronic zoom magnification of a timing when the stabilization switch is turned-on, and gradually increases the optical zoom magnification. Thus, a sudden change of a view angle due to a change of the electronic zoom magnification is suppressed.

4 Claims, 7 Drawing Sheets

VIDEO CAMERA WITH OPTICAL ZOOM MECHANISM AND PICTURE STABILIZER

BACKGROUND OF THE INVENTION

1. Field of the Invention

The present invention relates to a video camera. More specifically, the present invention relates to a compact video camera having an optical zoom mechanism, and a picture stabilizer which utilizes an electronic zoom mechanism.

2. Description of the Prior Art

One example of such a kind of compact video camera is discloses in pages 48 –54 of National Technical Report Vol. 37 No. Jun. 3, 1991. In the prior art, an image field is set within an image sensing area, and a motion vector due to unintentional movement of a camera is detected within the image field. At a succeeding field or frame, an image extracting area is set within the image field on the basis of the motion vector which is detected at a preceding field or frame, and a picture stabilization is performed by utilizing an electronic zoom circuit. It is determined whether a picture stabilization is to be performed in accordance with whether a picture stabilization switch is turned-on by an operator.

In a stabilization mode that is set by turning the stabilization switch on, a video signal is extracted from an image extracting area narrower than the image field. On the other hand, a stabilization releasing mode that is set by turning the stabilization switch off, a video signal is outputted from a whole image field. Therefore, when the stabilization mode is changed to the stabilization releasing mode, a view angle suddenly becomes large, and therefore, a subject becomes small suddenly. When the stabilization releasing mode is changed to the stabilization mode, since the view angle suddenly becomes small, a subject becomes large suddenly.

SUMMARY OF THE INVENTION

Therefore, a principal object of the present invention is to provide a novel video camera.

Another object of the present invention is to provide a video camera in which it is possible to prevent a view angle from being suddenly changed in changing a mode.

A video camera according to the present invention comprises an optical zoom means having a controllable optical zoom magnification and an electronic zoom means having a controllable electronic zoom magnification. At a time that a mode is to be changed between a stabilization mode and a stabilization releasing mode by means of switching means, first magnification changing means gradually changes the electronic zoom magnification of the electronic zoom means, and second magnification changing means gradually changes the optical zoom magnification of the optical zoom means in a direction that is opposite to a direction toward which the electronic zoom magnification is changed in accordance with the electronic zoom magnification that is changed by the first magnification changing means.

According to the present invention, a sudden change of a view angle due to a change of the electronic zoom magnification at a timing of mode change can be suppressed. Therefore, even if the mode is changed, no sudden change occurs in a size of a subject, and therefore, no stiff feeling occurs.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
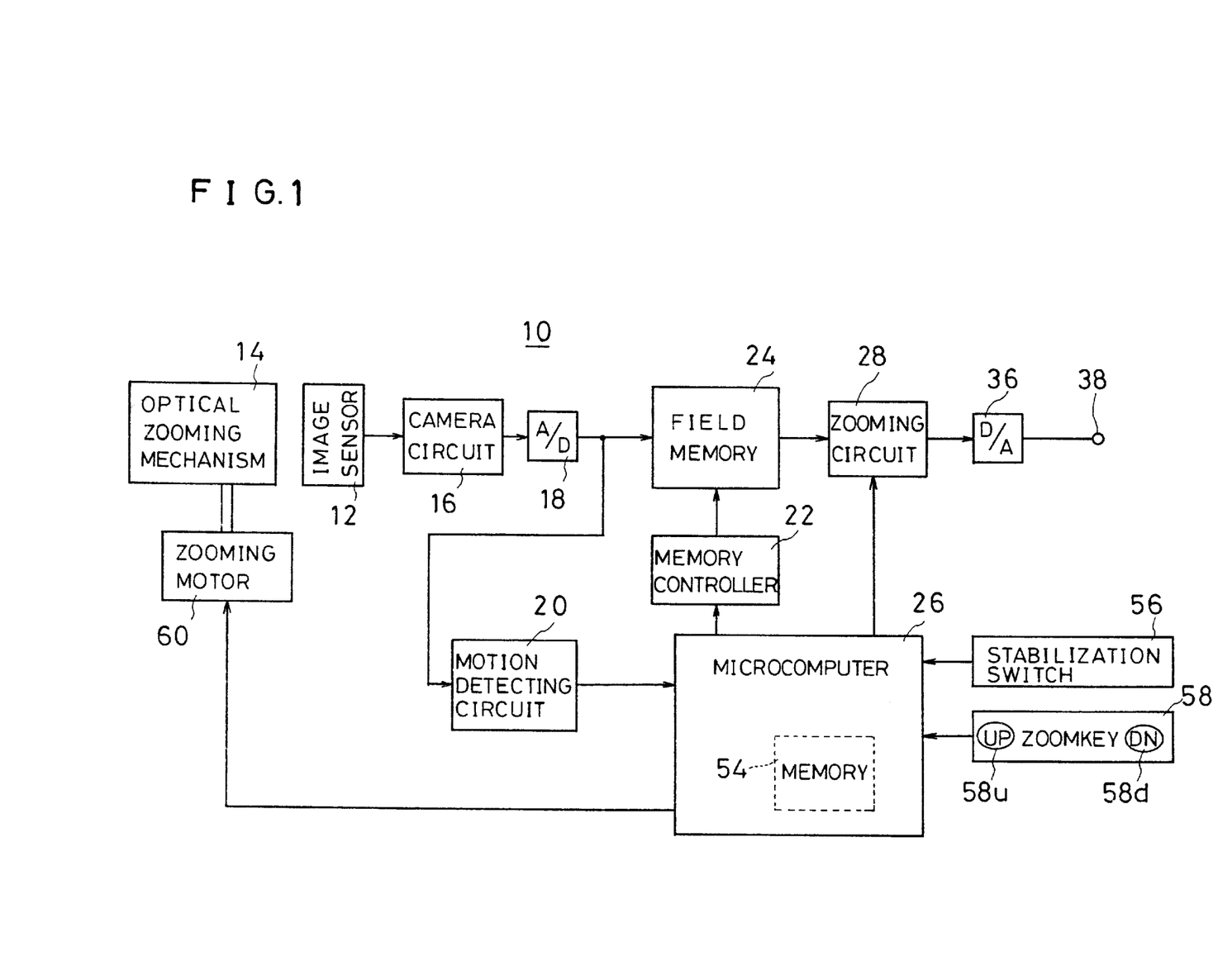
FIG. 1 is a block diagram showing one embodiment according to the present invention.

A video camera 10 of a preferred embodiment shown in FIG. 1 includes a solid-state image sensing device 12 such as a CCD (Charge-Coupled Device) which converts an optical signal being inputted from a subject (not shown) through optical zoom mechanism including lens (not shown) into an electric signal. The electric signal from the solid-state image sensing device 12 is inputted to a camera circuit 16. As well known, the camera circuit 16 includes a sample-hold circuit by which the electric signal from the solid-state image sensing device is sampled and held. A level of the electric signal thus sampled and held is adjusted by an AGC (Automatic Gain Control), and synchronization signals are added to the electric signal by a synchronization signal adding circuit 16 (not shown). Thus, the camera circuit converts the electric signal from the solid-state image sensing device 12 into an analog video signal. The analog video signal is further converted into a digital video signal by an A/D converter 18. The digital video signal is applied to a motion detecting circuit 20. As the motion detecting circuit 20, for example, an LSI "L7A0948" manufactured by Sanyo Electric Co., Ltd. who is an assignee of the present invention may be utilized. Under control of a memory control circuit 22 which is included in the same LSI constituting the motion detecting circuit 20, the digital video signal is written into a field memory 24 field by field.

Figure 2A:
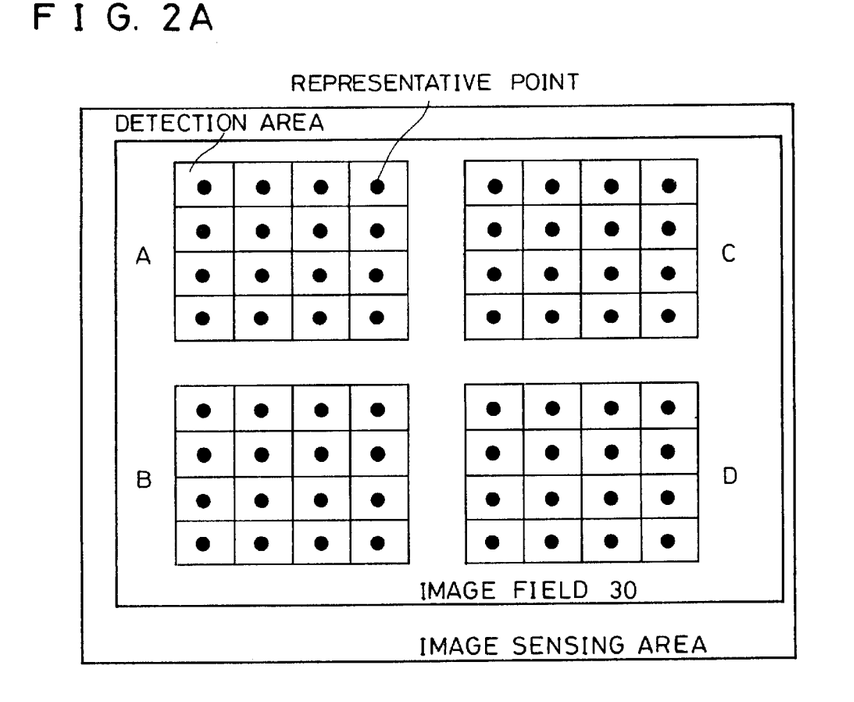
FIG. 2A and FIG. 2B are illustrative views showing blocks within an image field to which a representative point matching method is applied.

Although described later in detail, the motion detecting circuit evaluates correlative values, for each of respective blocks A, B, C and D shown in FIG. 2A by utilizing a well-known representative point matching method.

Figure 2B:
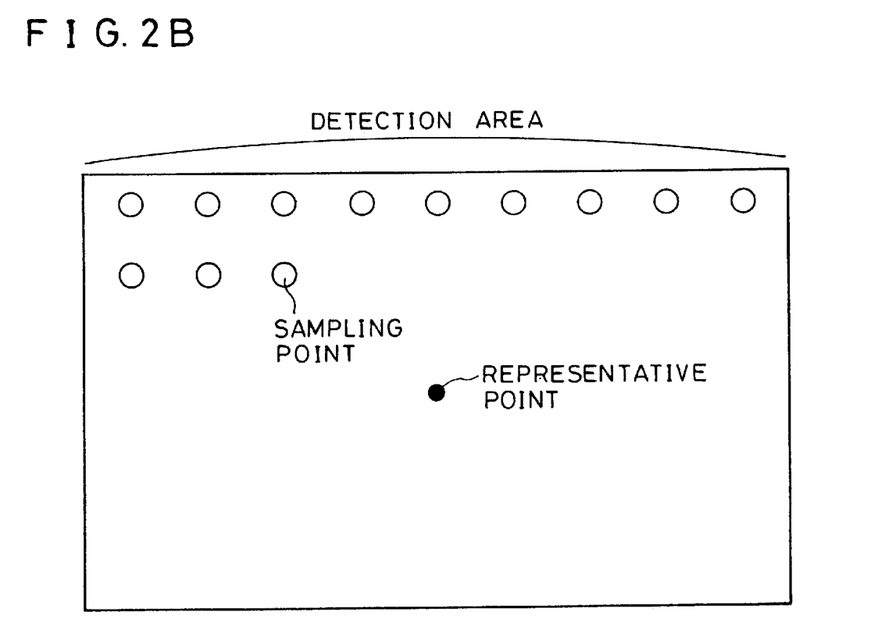

Now, with reference to FIGS. 2A and 2B, this representative matching method will be described. As shown in FIGS. 2A, an image field 30 is contained in an image sensing area that is formed by the sold-state image sensing device 12. There are formed four blocks A, B, C and D in the image field. Furthermore, each of the blocks includes a predetermined number (in FIG. 2A, "16") of detection areas. As shown in FIG. 2B, a detection area is composed of a plurality of sampling points out of which a representative point is determined. The motion detecting circuit calculates the correlative values on the basis of luminance levels of respective sampling points.

More specifically, in the motion detecting circuit 20, absolute values of differences between luminance level of the respective sampling points within each of the detection areas at a current field or frame and a luminance level of the representative point within the same detection area at a last filed or frame. That is, correlative values of the luminance levels of the respective sampling points with respect to the representative point in the same detection area are calculated. The correlative values of the luminance levels are accumulated for each of the sampling points having the same deviation in position with respect to the representative point, i.e. having the same positional relationship with respect to the representative point.

A sampling point having a minimum accumulated value is a point having a highest correlation degree. Positional data and correlative values (accumulated values) of the above described point and other four (4) points around the point.

The positional data and correlative values data from the motion detecting circuit are applied to a microcomputer 26. In the microcomputer 26, on the basis of the positional data and the correlative values data, an average motion vector of a whole image field 30 (FIG. 2) is calculated according to flowcharts described later in detail. Data of the average motion vector is applied to the memory control circuit 22 which determines a start address for reading the field memory 24, and therefore, the digital video signal is read-out from the field memory 24. In other words, the memory control circuit 22 moves an image extracting area 32 (FIG. 3 or 4) formed by the digital video signal stored in the field memory 24 according to the average motion vector that is calculated by the microcomputer 26.

In addition, it is impossible to move the image extracting area 32 by only the digital video signal read-out from the field memory 24, and therefore, in this embodiment shown, an electronic zoom circuit 28 is utilized.

Figure 3:
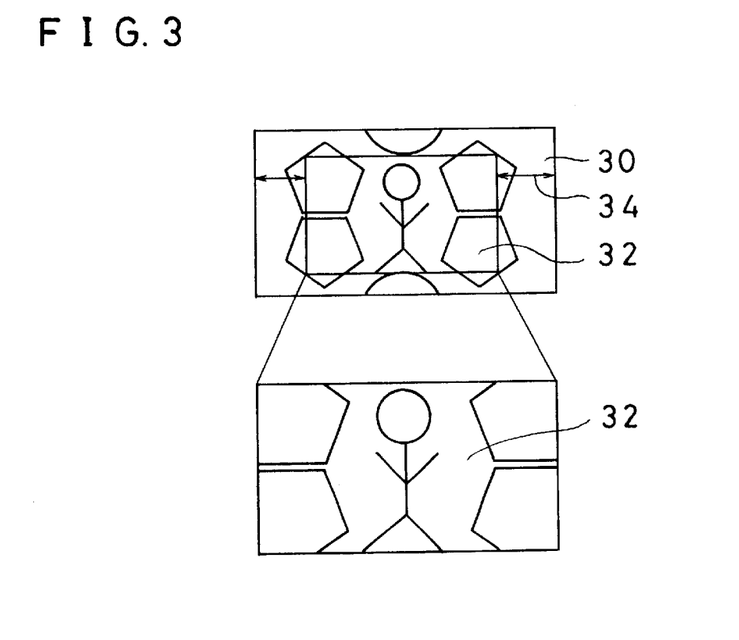
FIG. 3 is an illustrative view showing a principle of an electronic zoom process.

With reference to FIG. 3, the electronic zooming circuit 28 (FIG. 1) defines the image extracting area. 32 wherein an image is enlarged according to a zoom magnification with respect to the image field 30. A position of the image extracting area 32 can be freely moved within a range of the image field 30 by changing a start address for reading-out the digital video signal from the field memory 24. Then, in order to obtain a video signal for a whole area of the image field 30 on the basis of the digital video signal extracted from the image extracting area 32, an image is enlarged by utilizing an internal interpolation on the basis of the digital video signal-read-out from the field memory 24.

Thus, by zooming-up an image of an arbitrary image extracting area 32 within the image field 30 in an electronic manner by the electronic zoom circuit 28 (FIG. 1), a correctable range 34 that is equal to a difference between the image field 30 and the image extracting area 32 can be formed.

Figure 4:
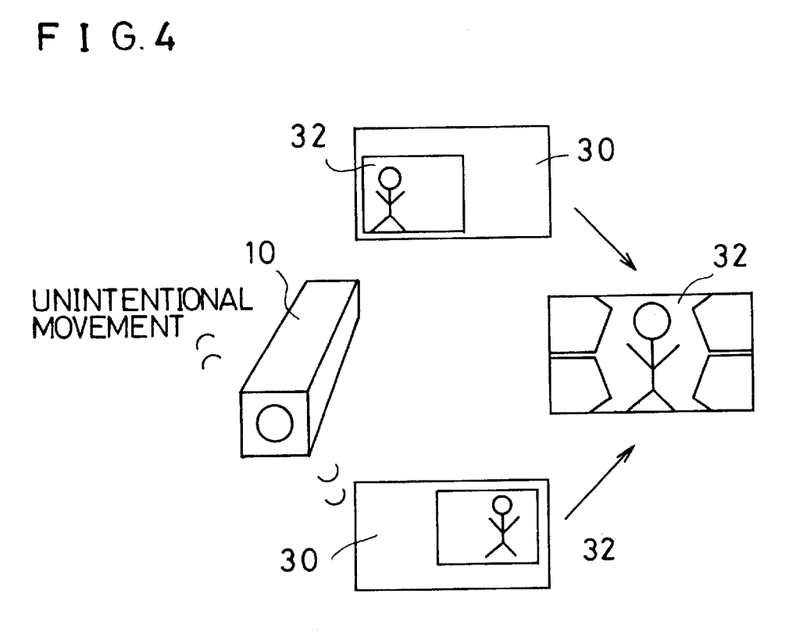
FIG. 4 is an illustrative view showing a principle of a picture stabilization.

If an unintentional movement occurs in the video camera 10 as shown in FIG. 4 according to a vibration of a hand of a person who operates the video camera, an image from the video camera is blurred, and resulting in a case where a subject person exists in a left-lower portion within the image field 30 (shown at an upper portion in FIG. 4) or a case where a subject person exists at a right-upper portion within the image field (shown at a lower portion in FIG. 4). Therefore, by moving the image extracting area 32 at every field or frame according to the average motion vector that is calculated by the microcomputer 26, as shown at a right portion in FIG. 4, the subject person can be just positioned in the image extracting area 32.

The digital video signal thus outputted from the electronic zoom circuit 28 is converted into an analog signal by a D/A converter 36 so as to be outputted from an output terminal 38.

Figure 5:
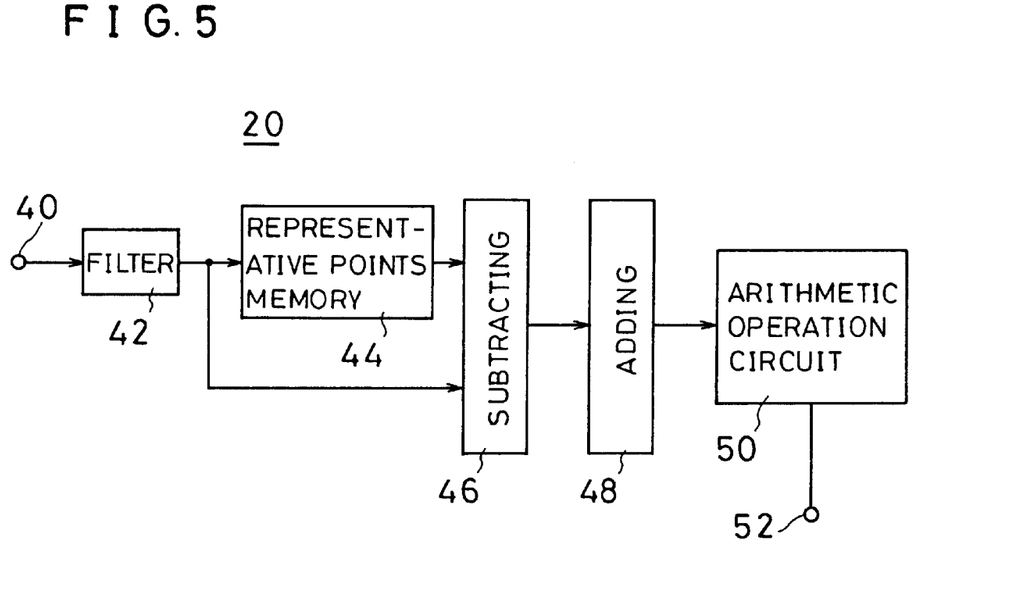
FIG. 5 is a block diagram showing a motion detecting circuit of FIG. 1.

With reference to FIG. 5, the motion detecting circuit 20 shown in FIG. 1 includes an input end 40 which receives the digital video signal from the A/D converter 18. The digital video signal inputted to the input end 40 is applied to the representative point memory 44 and a subtracting circuit 46, respectively, through a filter 42. The filter 42 is a kind of digital low-pass filter which is utilized for improvement of an S/N ratio so as to secure a significant detection accuracy with a lesser number of representative points.

The representative point memory 44 stores positional data and luminance data of a plurality of representative points within each of the respective blocks A–D shown in FIG. 2. The subtracting circuit 46 executes subtracting operations of the luminance data read-out from the representative point memory 44 of the representative point and another points or pixels surrounding the representative point, and applies a subtracted result to an accumulating and adding circuit 48. The accumulating and adding circuit 48. executes an accumulation and addition of the subtracted results by the subtracting circuit 46 of the same position or pixel in the same block so as to output correlative values data. The correlative values data is applied to an arithmetic operation circuit 50 which evaluates a minimum correlative value and calculates an average correlative value for each of the blocks A–D, and evaluates positional data of the pixel having the minimum correlative value. Data of the minimum correlative value, average correlative value and positions thus obtained by the arithmetic operation circuit 50 are applied to the above described-microcomputer 26 from an output end 52. In addition, such arithmetic operations for the correlative values can be performed by the above described LSI "L7A0948".

Returning to FIG. 1, a microcomputer 26 has a suitable memory 54, and to the microcomputer 26, a switch input and a key input from a stabilization switch 56 and a zoom key 58. Then, when the stabilization switch 56 is turned-on, the microcomputer 26 performs a picture stabilization by utilizing the above described electronic zoom circuit 28 in a manner that described in co-pending U.S. patent application Ser. No. 07/963,402 filed on Oct. 19, 1992, for example.

The zoom key 58 includes a zoom up key 58u for making a zoom magnification large and a zoom down key 58d for making a zoom magnification small. If the zoom up key 58u is depressed, the microcomputer 26, first, controls a zoom motor 60 so as to perform a zoom-up operation by utilizing the optical zoom mechanism 14, and when an optical zoom magnification reaches a limit thereof, succeedingly, the microcomputer 26 magnifies an image to a zoom magnification set by the zoom up key 58u by utilizing the electronic zoom circuit 28. When the electronic zoom circuit 28 is used, the microcomputer 26 gradually increase a magnification for the electronic zoom in association with a time that the zoom up key 58u is depressed. That is, the microcomputer gradually reduces the image extracting area 32 (FIG. 3). If the zoom down key 58d is depressed, an operation in reverse to the above described operation is performed.

In addition, when the stabilization switch 56 is turned-on, the microcomputer 26 fixedly sets an electronic zoom magnification to "1.2". In addition, such an electronic zoom magnification can be arbitrarily hanged according to a specification of a video camera. Such an operation of. the microcomputer will be described in the following in more detail with reference to FIG. 6 and FIG. 7.

Figure 6:
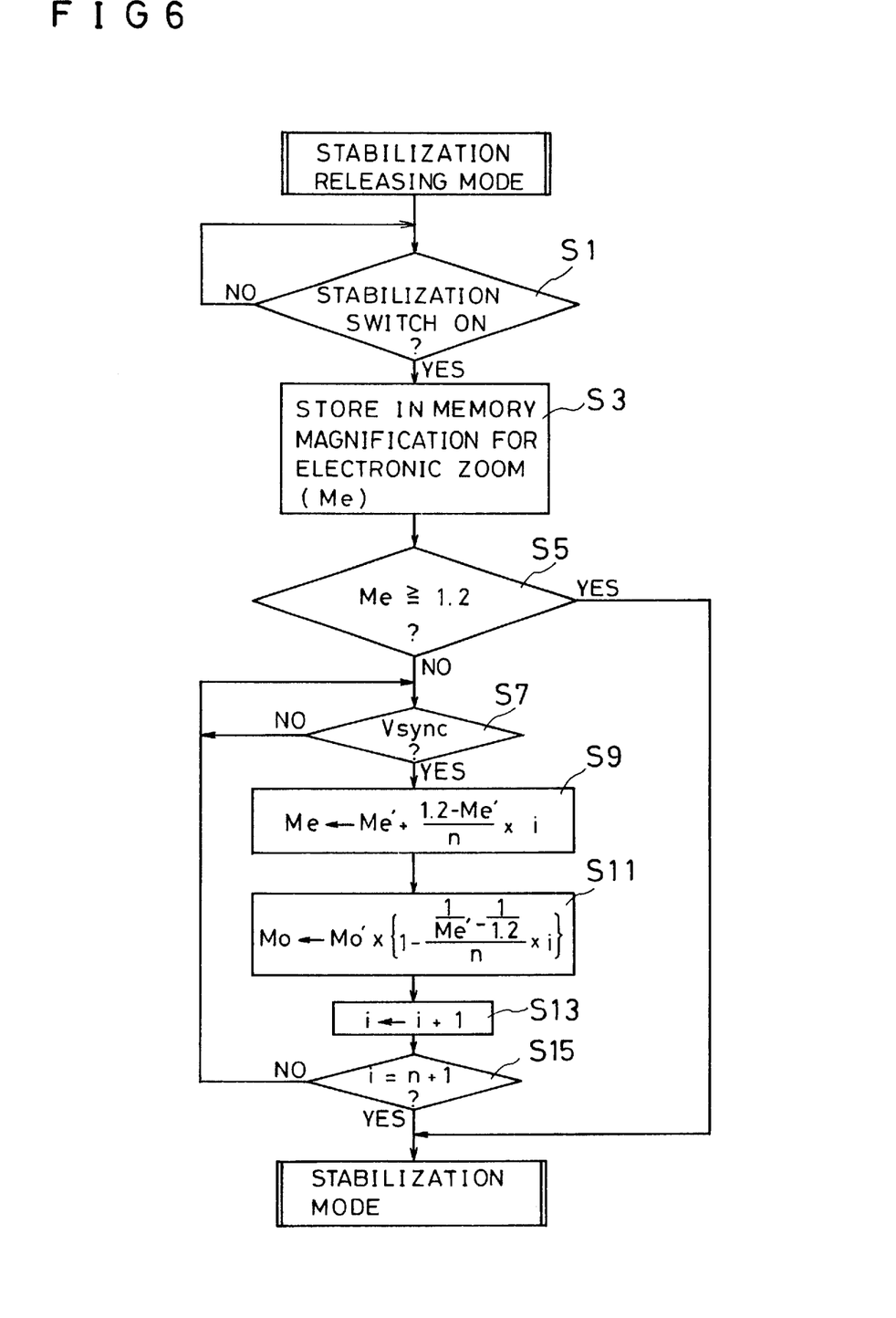
FIG. 6 and FIG. 7 are flowcharts showing operations of the embodiment.

At a time when the video camera operates in a stabilization releasing mode as shown in FIG. 6, if the microcomputer detects that the stabilization switch 56 is turned-on in a step S1, the microcomputer 26, in a next step S3, stores an electronic zoom magnification (Me), i.e. a size of the image extracting area 32 (FIG. 3) with respect to the image field 30 into the memory 54. In a next step S5, the microcomputer 26 determines whether the electronic zoom magnification stored in the memory 54 is larger than "1.2" that is a magnification for a picture stabilization. If "YES" is determined in the step S5, a process immediately proceeds to a picture stabilization mode.

However, if "NO" is determined in the step S5, since it is impossible to perform the picture stabilization at that electronic zoom magnification, the microcomputer 26 must set the electronic zoom magnification to "1.2". Then, if a vertical synchronization signal is detected in a step S7, the microcomputer 26, in a next step S9, calculates an electronic zoom magnification (Me) according to the following equation (1) and sets the same.

$$Me = Me' + \frac{1.2 - Me'}{n} \times i \qquad (1)$$

Me': an electronic zoom magnitication n: natural number

: 1

Since a view angle is suddenly changed if the electronic zoom magnification is thus changed, in order to suppress such a sudden change in the view angle, in this embodiment shown, in a next step S11, the microcomputer 26 calculates an optical zoom magnification (Mo) according to the following equation (2) so as to control the zoom motor 60 (FIG. 1).

$$Mo = Mo' \times \left\{ 1 - \frac{\frac{1}{Me'} - \frac{1}{1.2}}{n} \times i \right\} \qquad (2)$$

Mo': an intital value of hte optical zoom magnification

Me': an initial value of the electionic zoom magnification n: natural number i: 1

In a next step S13, the microcomputer 26 increments counter (not shown) formed in the memory 54 (FIG. 1), for example. Then, if "i" becomes "n+1" in a step S15, a process proceeds to the picture stabilization mode. That is, until "1" becomes "n+1" in the step S15, at every timing when the vertical synchronization signal is detected in the step S7, the steps S9–S13 are repeatedly executed. Therefore, the electronic zoom magnification (Me) is gradually increased while the optical zoom magnification (Mo) is gradually decreased. Therefore, a sudden reduction of the view angle that occurs due to a fact that the electronic zoom magnification is suddenly increased when the picture stabilization mode is set by the stabilization switch 56 can be prevented.

Figure 7:
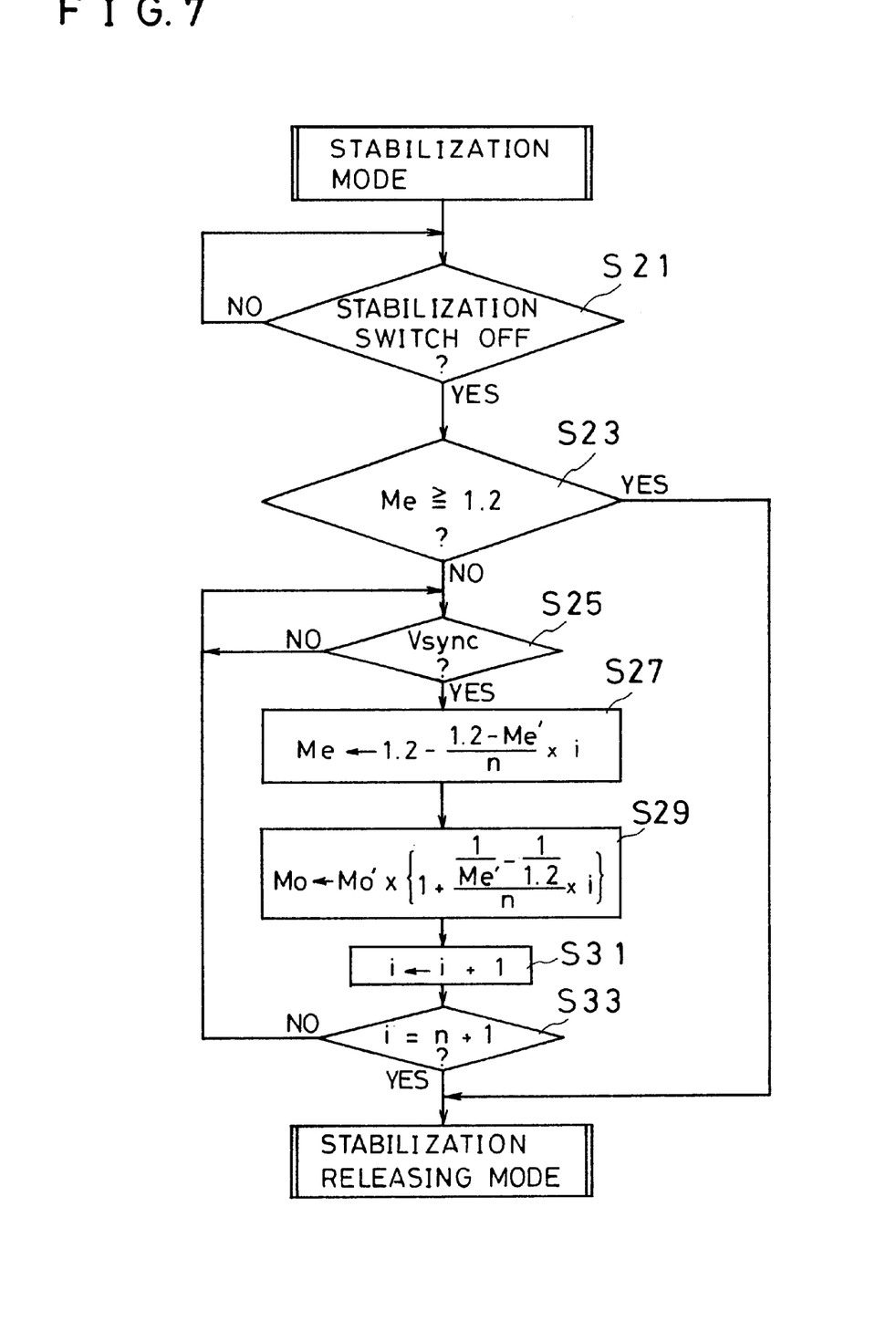

When a video camera operates in a picture stabilization mode as shown in FIG. 7, if the microcomputer 26 detects that the stabilization switch 56 is turned-off in a step S21, the microcomputer 26, in a next step S23, determines whether the electronic zoom magnification at a timing when the picture stabilization mode is set, that is, the electronic zoom magnification (Me) at a timing when the stabilization switch 56 is previously turned-on is larger than "1.2". If "YES" is determined in the step S23, a process immediately proceeds to the stabilization releasing mode.

However, if "NO" is determined in the step S23, it is necessary to return the electronic zoom magnification to an electronic zoom magnification at a timing when the stabilization switch 56 is previously turned-on. Then, if a vertical synchronization signal Vsync is detected in a step S25, the microcomputer 26, in a next step S27, calculates an electronic zoom magnification (Me) according to the following equation (3) and sets the same.

$$Me = 1.2 - \frac{1.2 - Me'}{n} \times i \qquad (3)$$

Me': an initial value of the electronic zoom magnification n: natural number i: 1

Since a view angle is suddenly changed if the electronic zoom magnification is thus changed, in order to suppress such a sudden change of the view angle, in this embodiment shown, in a next step S29, the microcomputer 26 calculates an optical zoom magnification (Mo) according to the following equation (4) so as to control the zoom motor 60 (FIG. 1).

$$Mo = Mo' \times \left\{ 1 + \frac{\frac{1}{Me'} - \frac{1}{1.2}}{n} \times i \right\} \qquad (2)$$

Mo': the optical zoom magnification in performing the picture stabilization

Me: an initial value of the electronic zoom magnification n: natural number i: 1

In a next step S31, the microcomputer 26 increments the counter (not shown) to increment "i". Then, "i" becomes equal to "n+1" in a step S3, a process proceeds to the stabilization releasing mode. That is, until "i" becomes "n+1" in the step S31, at every timing when the vertical synchronization signal is detected in the step S25, the steps S27–S33 are repeatedly executed. Therefore, the electronic zoom magnification (Me) is gradually decreased while the optical zoom magnification (Mo) is gradually increased. Therefore, a sudden enlargement of a view angle that occurs due to a fact that the electronic zoom magnification is suddenly decreased when the stabilization releasing mode is set by the stabilization switch 56 is effectively prevented.

Figure 8:
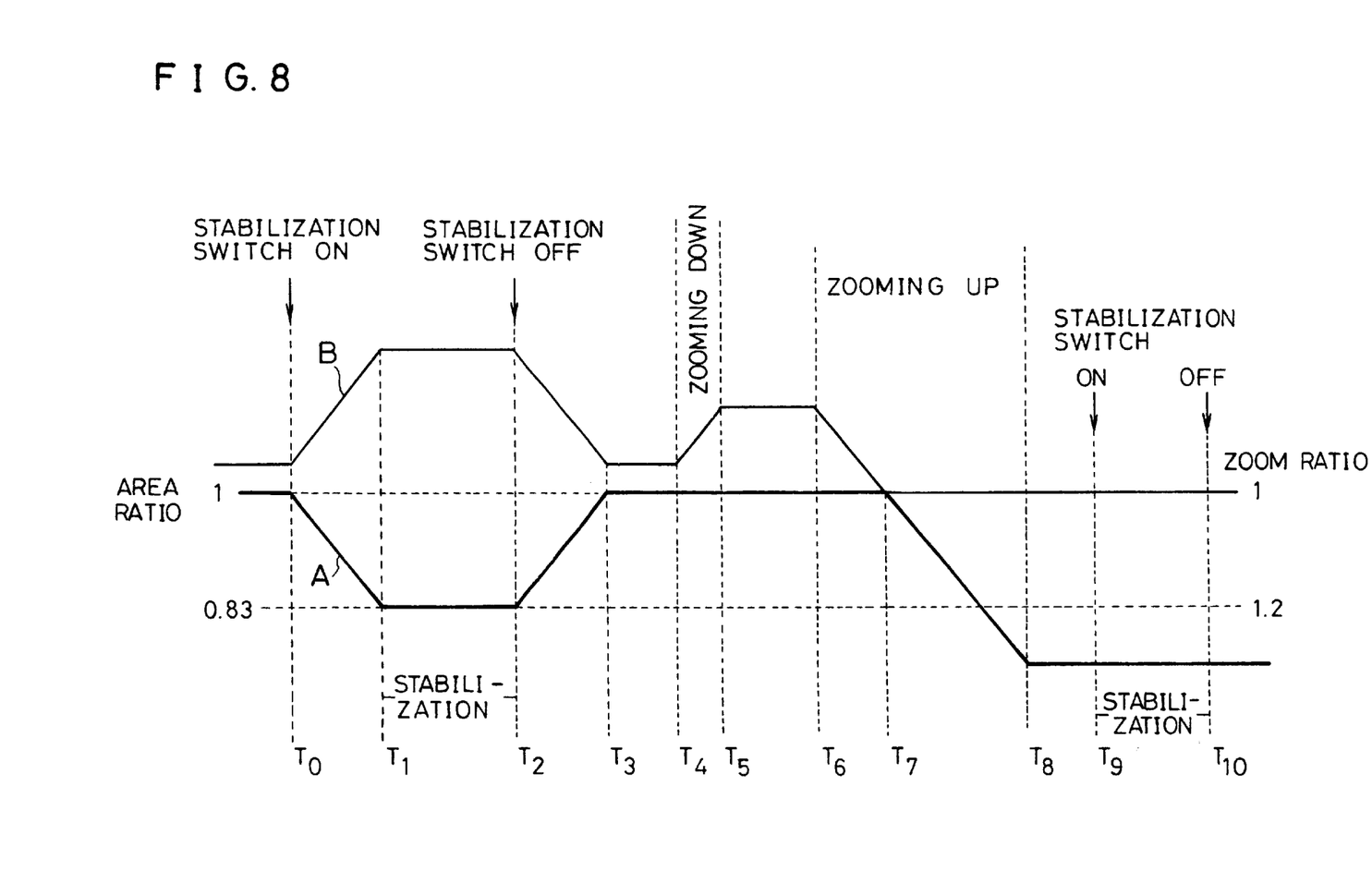
FIG. 8 is a timing chart showing changing states of an optical zoom magnification and an electronic zoom magnification according to the present invention.

Thus, the microcomputer 26 gradually changes the optical zoom magnification in association with the electronic zoom magnification so that a sudden change of a view angle due to a sudden change of the electronic zoom magnification according to a mode change between a stabilization mode and the stabilization releasing mode can be suppressed. Therefore, according to the embodiment shown, an operation as shown in FIG. 8 can be performed. In addition, in FIG. 8, a line A denotes a change of the electronic zoom magnification, and a line B denotes a change of the optical zoom magnification.

In a state where the electronic zoom magnification is in a range "1–1.2", that is, in a state where an area ratio of the image extracting area 32 with respect to an area of the image field is in a range "1–0.83", if the stabilization switch 56 is turned-on so that the stabilization releasing mode is changed into the stabilization mode, the stabilization mode is performed after a subject is zoomed-up by gradually reducing the image extracting area 32 (FIG. 3), that is, by gradually increasing the electronic zoom magnification in a transient period from a timing $T_0$ to a timing $T_1$ of FIG. 8. At this time, the optical zoom magnification is gradually decreased, whereby a sudden change of a view angle in proceeding to the stabilization mode is prevented.

If the stabilization mode is changed into the stabilization releasing mode by turning-off the stabilization switch 56, the microcomputer 26 gradually enlarges the image extracting area 32, that is, gradually decreases the electronic zoom magnification in a transient period from a timing $T_2$ to a timing $T_3$ of FIG. 8, and thereafter, the microcomputer 26 performs an operation of the stabilization releasing mode. At this time, since the optical zoom magnification is gradually increased, a sudden change of a view angle in proceeding to the stabilization releasing mode is effectively prevented.

In the stabilization releasing mode, the zoom down key 58d of the zoom key 58 is depressed during a time from a timing $T_4$ to a timing $T_5$ of FIG. 8, during a period when the zoom down key 58d is depressed, the microcomputer 26 gradually decreases the zoom magnification of the optical zoom mechanism 14 by controlling the zoom motor 60. In addition, if the zoom up key 58u of the zoom key 58 is depressed during a time from timing $T_5$ to a timing $T_7$, the microcomputer 26 controls the zoom motor 60 so as to gradually increase the zoom magnification of the optical zoom mechanism 14. Then, after a timing T7 when the zoom magnification of the optical zoom mechanism 14 reaches a limit thereof, the microcomputer 26 enables the electronic zoom function, and therefore, the image extracting area 32 is reduced. That is, the electronic zoom magnification is increased, and thus, the electronic zoom magnification becomes more than "1.2". In such a state, if the stabilization switch 56 is turned-on at a timing $T_9$ of FIG. 8, the microcomputer 26 does not further increase the electronic zoom magnification, and continues the picture stabilization operation. Furthermore, if the stabilization switch 56 is turned-off at a timing $T_{10}$ of FIG. 8, since the electronic zoom magnification at that time is more than "1.2", an operation of the stabilization releasing mode is continuously performed.

In addition, in the above described embodiment, the electronic zoom magnification for the stabilization mode is fixedly set as "1.2". However, a specific value of the electronic zoom magnification for the stabilization mode is not limited to "1.2", and such an electronic zoom magnification may be variably set according to an operation of the operator.

Furthermore, in the above described equation (1) and (3) for gradually changing the electronic zoom magnification and the above described equations (2) and (4) for gradually changing the optical zoom magnification, it will be apparently understood that by change a value of "n", a degree of change in the electronic zoom magnification and/or the optical zoom magnification can be arbitrarily set. In addition, the above described equations may be suitably modified.

Although the present invention has been described and illustrated in detail, it is clearly understood that the same is by way of illustration and example only and. is not to be taken by way of limitation, the spirit and scope of the present invention being limited only by the terms of the appended claims.

What is claimed is:

1. A video camera which comprises optical zoom means having a controllable optical zoom magnification and electronic zoom means having a controllable electronic zoom magnification, further comprising:

switch means for selectively setting a picture stabilization mode and a stabilization releasing mode;

first magnification changing means for changing the electronic zoom magnification of said electronic zoom means when a mode is to be changed between said picture stabilization mode and said-stabilization releasing mode; and second magnification changing means for changing the optical zoom magnification optical optical zoom means according to the electronic, zoom magnification that is changed by said first magnification changing, means, in a direction opposite to a direction that said electronic zoom magnification is changed.

2. A video camera according to claim 1, wherein said first magnification changing means gradually changes the electronic zoom magnification and said second magnification changing means gradually changes the optical zoom magnification.

3. A video camera according to claim 2, wherein, within a given zoom range when a mode is to be changed from said stabilization releasing mode to said picture stabilization mode, said first magnification changing means gradually increases the electronic zoom magnification and said second magnification changing means gradually decreases the optical zoom magnification.

4. A video camera according to claim 2, wherein, within a given zoom range when a mode is to be changed from said picture stabilization mode to said stabilization releasing mode, said first magnification changing means gradually decreases the electronic zoom magnification and said second magnification changing means gradually increases the optical zoom magnification.

* * * * *